United States Patent [19]

Hiramatsu

[11] Patent Number: 4,480,904
[45] Date of Patent: Nov. 6, 1984

[54] ANTI-MIRROR-BOUNCE DEVICE FOR SINGLE-LENS REFLEX CAMERA

[75] Inventor: Akira Hiramatsu, Kanagawa, Japan

[73] Assignee: Canon Kabushiki Kaisha, Tokyo, Japan

[21] Appl. No.: 438,960

[22] Filed: Nov. 3, 1982

[30] Foreign Application Priority Data

Nov. 12, 1981 [JP] Japan .................... 56-181550

[51] Int. Cl.³ ............... G03B 7/099; G03B 19/12
[52] U.S. Cl. ...................... 354/479; 354/152
[58] Field of Search ...................... 354/152, 479

[56] References Cited

U.S. PATENT DOCUMENTS 4,091,399 5/1978 Ohmori .................... 354/152
4,342,508 8/1982 Haraguchi .................... 354/152

Primary Examiner—Michael L. Gellner
Attorney, Agent, or Firm—Toren, McGeady and Stanger

[57] ABSTRACT

A single-lens reflex camera of the class having a main movable mirror which guides light flux coming through a photo-taking lens to a view finder, an auxiliary movable mirror which is arranged behind the main movable mirror to guide a part of the light flux to light or distance measuring device and a mirror driving mechanism which is arranged to move these movable mirrors away from a photo-taking optical path at the time of exposing a film to light is provided with an anti-mirror-bounce device comprising a first anti-bounce member which prevents the main movable mirror from bouncing by engaging the main movable mirror in response to the return of the main mirror to a point close to its original position after completion of the film exposure; and a second anti-bounce member which prevents the auxiliary mirror from bouncing by engaging the auxiliary movable mirror in response to the return of the auxiliary mirror to a point close to its original position. The anti-mirror-bounce device protects the light or distance measuring device of the camera from being affected by bounces of the movable mirrors.

13 Claims, 7 Drawing Figures

ANTI-MIRROR-BOUNCE DEVICE FOR SINGLE-LENS REFLEX CAMERA

BACKGROUND OF THE INVENTION

1. Field of the Invention

This invention relates to an anti-mirror-bounce device for a single-lens reflex camera having a main movable mirror which guides light flux coming through a photo-taking lens to a view finder, an auxiliary movable mirror which is arranged behind the main movable mirror to guide a part of the light flux to a light or distance measuring device and a mirror driving mechanism which is arranged to move these mirrors away from a photo-taking optical path.

2. Description of the Prior Art

Generally, in a single-lens reflex camera of the class having a main movable mirror which guides light flux coming through a photo-taking lens to a view finder and an auxiliary movable mirror which is arranged behind the main movable mirror to guide a part of the light flux to a light or distance measuring device, a mirror box is disposed behind the photo-taking lens. The main movable mirror which is either wholly or partially formed to be semitransparent is pivotally carried within the mirror box. The auxiliary movable mirror is also pivotally carried in the rear of the main movable mirror. A light flux which passes through the main movable mirror is reflected by the auxiliary movable mirror to be guided to a light sensitive element provided at the bottom of the mirror box for light or distance measurement. These movable mirrors are arranged to be sprung upward by the mirror driving mechanism away from a photo-taking optical path at the time of exposing a film to light for photographing. Upon completion of the photographing process, these mirrors are brought back to their predetermined original positions by means of a return spring and are stopped there by colliding with stoppers. However, when the return spring brings the main and auxiliary movable mirrors back to their original positions after photographing operation, these mirrors are caused to bounce to a considerable degree by the spring force of the return spring and the inertia of the movable mirrors as they come to abut on the stoppers. Particularly, the bounce of the movable mirrors is accelerated and complicated by an additional bounce of a driving lever in the case of a camera where movable mirrors are arranged to be uplifted in a retracting manner for the purpose of limiting the movable extent of movement of the main movable mirror for reduction in space requirement with the center of rotation of the main movable mirror arranged to be pivotally carried by the mirror driving lever and to have the mirror retracted in uplifting the mirror.

The bounce which takes place when the mirrors come back to their original positions makes it hardly possible to obtain good pictures through a high speed continuous photographing operation carried out with an automatic winding device, because in the case of high speed continuous photography, light measurement must be carried out within a short winding period. Then, the light flux which comes through the main movable mirror and is reflected by the auxiliary movable mirror is prevented from coming to the light sensitive element by the bounce of the auxiliary movable mirror thereby resulting in inaccurate light measurement or in the complete prevention of light measurement until the bounce is over. The bounce of mirrors thus makes high speed continuous photography virtually impossible. Further, in the case of a camera where the light flux which comes through the main movable mirror and is reflected by the auxiliary movable mirror is arranged to be guided to a distance measuring light sensitive element for distance measurement, this problem is more serious, because distance measurement generally requires a longer time than light measurement.

The prior art attempts to solve this problem include a Japanese Utility Model Application Laid-Open No. 54-70531 (the applicant: Asahi Kogaku) and another Japanese Utility Model Application Laid-Open No. 54-16223 (Nihon Kogaku). In accordance with these prior art attempts, a stopper which is disposed at the returning position of a movable mirror is arranged to be resilient so that the bounce of the movable mirror can be suppressed by absorbing the impact of the movable mirror inflicted on the stopper when the mirror comes to abut thereon in its returning position. However, the bounce of the movable mirror still cannot be suppressed to a sufficient extent to permit high speed continuous photography. Besides, the methods disclosed in these Japanese Utility Model Applications are intended to prevent the bounce of a single movable mirror and are not contrived for preventing the bounce of a plurality of bouncing parts including main and auxiliary movable mirrors and a driving lever which is arranged to drive the movable mirrors. Another anti-bounce method of the prior art for preventing a movable mirror from bouncing when it returns to its original position is disclosed in a Japanese Patent Application Laid-Open No. 54-105532 (the applicant: Canon). In this case, an anti-bounce device is arranged to positively prevent a mirror from bouncing in such a way as to tightly hold it, so that the mirror can be sufficiently prevented from bouncing to permit high speed continuous photography without any impediment. However, this arrangement of the prior art is also intended for a single movable mirror and is not applicable where bounce of a plurality of members must be suppressed.

SUMMARY OF THE INVENTION

It is a first object of the invention to provide an anti-mirror-bounce device for a camera having a main movable mirror and an auxiliary movable mirror, the anti-mirror-bounce device including a first anti-bounce member which prevents the main movable mirror from bouncing by engaging the main mirror in response to the return of the main mirror to a point close to its original position after a film is exposed to light; and a second anti-bounce member which prevents the auxiliary movable mirror from bouncing by engaging the auxiliary mirror in response to the return of the auxiliary mirror to a point close to its original position after the main mirror reaches the point close to the original position thereof. The device according to the first object of the invention is capable of efficiently suppressing the bounces of these mirrors in a short period of time to ensure a satisfactory operation of high speed continuous photography.

It is a second object of the invention to provide an anti-mirror-bounce device for a camera having a main movable mirror, an auxiliary movable mirror and a driving lever which drives the movable mirrors by pivotally carrying the center of rotation of the main movable mirror, the anti-mirror-bounce device including a first anti-bounce member which prevents bounce of the main movable mirror by engaging the main mirror in response to the return of the main mirror to a point close to its original position after a film is exposed to light; a second anti-bounce member which prevents the auxiliary movable mirror bouncing by engaging the auxiliary mirror in response to the return of the auxiliary mirror to a point close to its original position after the main mirror reaches the point close to the original position of the main mirror; and a third anti-bounce member which prevents the driving lever from bouncing by engaging the lever in response to the return of the lever to a point close to its original position after the main mirror reaches the point close to the original position thereof. The device according to the second object of the invention is also capable of efficiently suppressing the bounces of these mirrors in a short period of time to enable a high speed continuous photographing operation to be carried out in a satisfactory manner.

These and further objects and features of the invention will become apparent from the following detailed description of embodiments thereof taken in conjunction with the accompanying drawings.

DETAILED DESCRIPTION OF THE PREFERRED EMBODIMENTS

Figure 1:
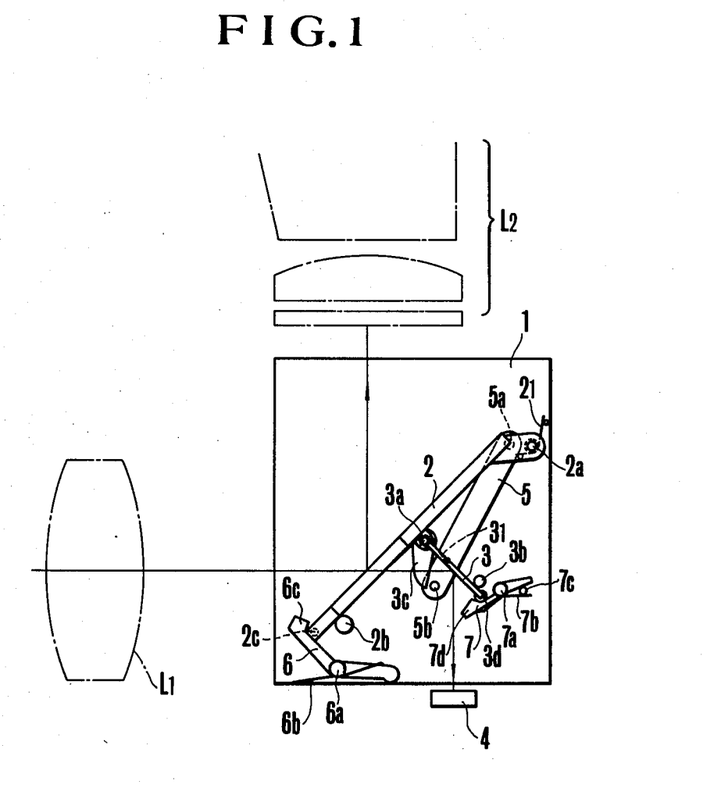
FIG. 1 is a front view showing an anti-mirror-bounce device as a first embodiment of the invention having movable mirrors in their lowered positions.
Figure 2:
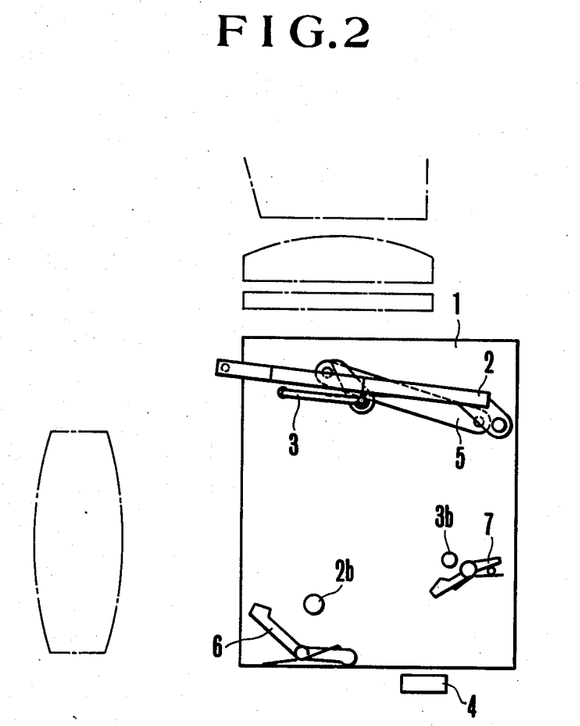
FIG. 2 is a front view of the device of FIG. 1 having the movable mirrors in their uplifted positions.

In a first embodiment of the invention shown in FIGS. 1 and 2, as having movable mirrors in their lowered and uplifted positions, respectively, a mirror box 1 is disposed in the rear of a photo-taking lens group L1 of a single-lens reflex camera. A main movable mirror 2 which is either partially or wholly semi-transparent is disposed within the mirror box 1 and is pivotally carried at its upper end by a pivotal shaft 2a. The main movable mirror 2 is thus arranged to guide light flux coming through the photo-taking lens group to a view finder optical system L2. Behind the main movable mirror 2 is disposed an auxiliary movable mirror 3 which is pivotally carried by the main movable mirror 2 through a pivotal shaft 3a and is arranged to guide a light flux passing through the main mirror to a light or distance measuring device. The light or distance measuring device is provided with a light sensitive element 4 which is disposed at the bottom of the mirror box 1. The main movable mirror 2 which is pivotally carried by the shaft 2a is constantly urged by a force of a spring 21 to move counterclockwise and is kept in a predetermined position by a stopper 2b which is erected on the mirror box 1. Meanwhile, the auxiliary movable mirror 3 which is pivotally carried by the pivotal shaft 3a behind the main movable mirror 2 is constantly urged to move counterclockwise by a force of a spring 31 and is kept in a predetermined position by a stopper 3b which is erected on the mirror box 1.

The embodiment includes a driving lever 5 which is arranged to move the movable mirrors away from a phototaking optical path by springing the movable mirrors upward when a film is to be exposed to light. The driving lever 5 is swingable on a shaft 5a erected on the main movable mirror 2 and is arranged to be driven by a known mirror quick return device which is not shown. The auxiliary movable mirror 3 is provided with a cam 3c which is formed into one unified body with the auxiliary movable mirror 3 and is arranged to engage a pin 5b secured to the fore end of the driving lever 5. At the time of a film exposure, when the driving lever 5 rotates on the shaft 5a, the auxiliary movable mirror 3 is first rotated thereby on the shaft 3a through the cam 3c until the mirror 3 abuts on the back of the main movable mirror 2. After that, the main and auxiliary movable mirrors 2 and 3 are sprung up together and are thus removed from the photo-taking optical path as shown in FIG. 2. Upon completion of a photographing operation, the return springs 21 and 31 which are exerting their forces to rotate these mirrors counterclockwise cause the mirrors to come back to their original positions.

In a single-lens reflex camera of this type, the movable mirrors tend to bounce when they are brought back to their original positions by the forces of the return springs after completion of a film exposure. To prevent the bounce of the movable mirrors, therefore, the embodiment of the invention includes a first anti-bounce member which prevents the main movable mirror 2 from bouncing by engaging it when it comes back to a point close to its original position. In addition to the first anti-bounce member, the embodiment includes a second anti-bounce member which prevents the auxiliary movable mirror 3 from bouncing by engaging it when it comes back to a point close to its original position after the main movable mirror 2 comes back to the original position thereof.

In the specific embodiment shown, the first anti-bounce member is composed of a lever 6. This anti-bounce lever 6 is pivotally supported by a shaft 6a which is erected on the mirror box 1 and is urged to move clockwise by the force of a spring 6b. The lever 6 engages the bottom surface of the mirror box 1 and is arranged to engage a pin 2c, which is secured to one fore end of the main movable mirror 2, by means of a hooked part 6c which is provided at one end of the anti-bounce lever 6 for preventing the main movable mirror 2 from bouncing.

The second anti-bounce member is composed of a lever 7. This anti-bounce lever 7 is pivotally supported by a shaft 7a which is erected on the mirror box 1 and is urged to move clockwise by the force of a spring 7b. A pin 7c engages the lever 7 to hold the lever 7 which is being urged clockwise. The lever 7 is provided with a hooked part 7d, which is secured to one end of the anti-bounce lever 7 and is arranged to prevent the auxiliary movable mirror 3 from bouncing by engaging a pin 3d which is secured to the fore end of the auxiliary movable mirror 3.

In the single-lens reflex camera which has been described above, the main movable mirror 2 and the auxiliary movable mirror 3 are kept in their positions as shown in FIG. 1 before the film is exposed to light. When a film exposing operation is performed, a known mirror quick-return device which is not shown causes the driving lever 5 to rotate upward on the shaft 5a. The pin 5b which is secured to the driving lever 5 then comes to abut on the cam 3c which is arranged in one unified body with the auxiliary movable mirror 3. This causes the auxiliary movable mirror 3 to rotate clockwise against the force of the spring 3 which is urging the mirror 3 to rotate counterclockwise. Then, against the force of the spring 7b, the pin 3d which is secured to the auxiliary movable mirror 3 comes to push away the hooked part 7d of the anti-bounce lever 7 to allow the auxiliary movable mirror 3 to be rotated clockwise until the mirror 3 is thus pushed against the back of the main movable mirror 2. After that, the driving lever 5 causes the main and auxiliary movable mirrors 2 and 3 to rotate together. Then, the pin 2c secured to the main movable mirror 2 pushes away the hooked part 6c of the anti-bounce lever 6 by causing it to turn counterclockwise against the force of the spring 6b. With the hooked part 6c pushed away, the main movable mirror 2 is rotated upward until it reaches the position as shown in FIG. 2.

After completion of a film exposure, the mirror quick-return mechanism which is not shown causes the driving lever 5 to descend. This causes the main and auxiliary movable mirrors 2 and 3 to be moved downward together by the force of the spring 21. The main movable mirror 2 comes to abut on the stopper 2b. At this instant, the pin 2c comes to abut on the slanting surface of the hooked part 6c of the anti-bounce lever 6. Then, against the force of the spring 6b, the force of the spring 21 causes the anti-bounce lever 6 to rotate counterclockwise. This causes the pin 2c of the main movable mirror 2 to engage the anti-bounce lever 6 when the main movable mirror 2 reaches the original position thereof, so that the main movable mirror 2 can be prevented from bouncing by this engagement. When the driving lever 5 further rotates, the spring 31 causes the auxiliary movable mirror 3 to rotate counterclockwise. The pin 3d on the mirror 3 then comes to abut on the slanting surface of the hooked part 7d of the anti-bounce lever 7. The force of the spring 31 then causes the anti-bounce lever 7 to rotate counterclockwise against the force of the spring 7b to bring the auxiliary movable mirror 3 back to its original position. Upon return of the auxiliary movable mirror 3 to its original position, the pin 3d engages the anti-bounce lever 7 to prevent the mirror 3 from bouncing and there again obtains the condition as shown in FIG. 1.

Figure 3:
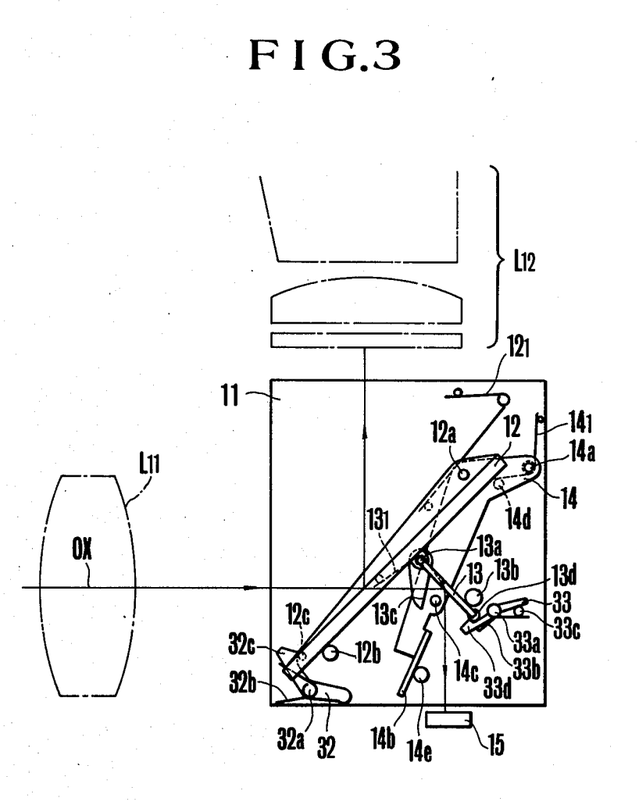
FIG. 3 is a front view showing another anti-mirror-bounce device as a second embodiment of the invention and having movable mirrors in their lowered positions.
Figure 4:
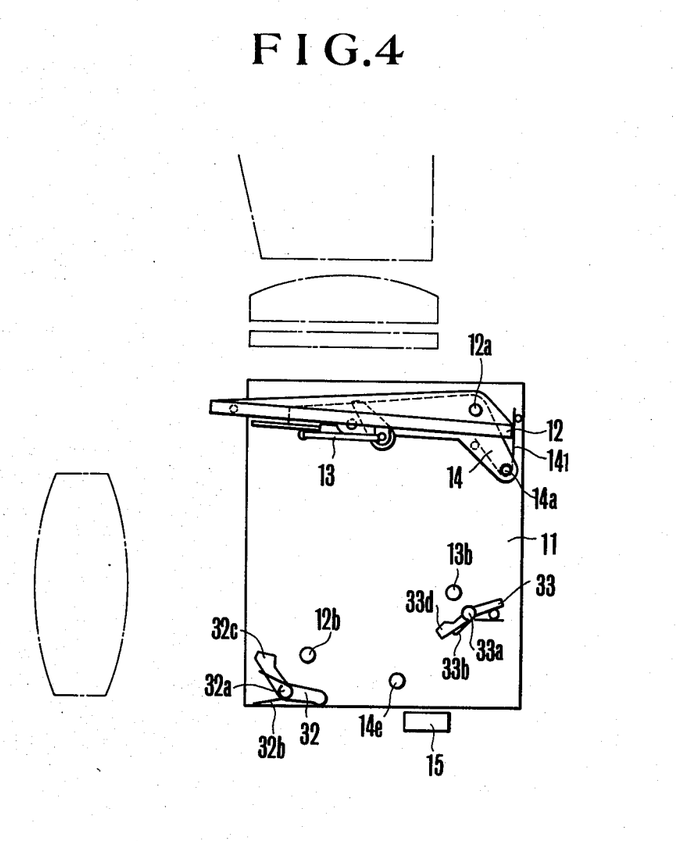
FIG. 4 is a front view showing the device of FIG. 3 having the movable mirrors in their uplifted positions.

A second embodiment of the invention is as shown in FIGS. 3 and 4. FIG. 3 shows the embodiment as having movable mirrors in their lowered positions while FIG. 4 shows it as having the movable mirrors in their uplifted positions. This embodiment represents a single-lens reflex camera of the type having the main movable mirror arranged to be retracted when it is uplifted. The camera includes a photo-taking lens group L11. A mirror box 11 is disposed in the rear of the photo-taking lens group L11. A main movable mirror 12 is arranged to guide light flux which has passed through the photo-taking lens group L11 to a view finder optical system L12. An auxiliary movable mirror 13 is arranged to guide light flux which passes through the main movable mirror to a light or distance measuring light sensitive element. A driving lever 14 is arranged to move these movable mirrors away from a photo-taking optical path at the time of photography as shown in FIG. 4 and to bring them back to their original positions as shown in FIG. 3 after a film is exposed to light.

The main movable mirror 12 is partially or wholly formed as a semi-transparent mirror or a half mirror. The main movable mirror 12 is pivotally carried by the driving lever 14 through a shaft 12a. A return spring 12l urges the main movable mirror 12 to rotate counterclockwise while the latter abuts on a stopper 12b and is kept in a predetermined position as shown in FIG. 3. The auxiliary movable mirror 13 is pivotally carried by the main movable miror in rear thereof through a shaft 13a. The mirror 13 is arranged to reflect light flux which has passed through the semi-transparent part of the main movable mirror and to guide the light flux to a light or distance measuring light sensitive element 15 which is disposed at the bottom of the mirror box 11. A return spring 13l urges the auxiliary movable mirror to rotate counterclockwise while the latter is stopped from rotating by a stopper 13b which thus keeps the auxiliary movable mirror 13 in a predetermined position as shown in FIG. 3. A cam 13c is formed in one unified body with the auxiliary movable mirror 13.

The driving lever 14 is pivotally carried by the mirror box through a shaft 14a and is provided with a light shielding member 14b which is disposed at one end of the driving lever 14 and also with an actuating pin 14c which is arranged in the middle part of the driving lever 14 to actuate the auxiliary movable mirror 13 by abutting on the cam 13c. The driving lever 14 is further provided with a driving pin 14d which is arranged to be driven at the time of a film exposure by a mirror driving device which will be described later herein. This mirror driving device causes the driving lever 14 to rotate on the shaft 14a at the time of a film exposure. Upon completion of the exposure, a return spring 14l causes the driving lever 14 to come back to its original position and to abut on a stopper 14e to be kept in the predetermined position thereof as shown in FIG. 3.

In carrying out a film exposure, when the driving lever 14 rotates on the shaft 14a, the rotation of the lever 14 causes, through the cam 13c, the auxiliary movable mirror 13 to rotate on the shaft 13a to cause the mirror 13 to abut on the back of the main movable mirror 12. Concurrently with this, the light transmissable part of the main movable mirror 12 is covered by the light shielding member 14b. Following that, the main and auxiliary mirrors 12 and 13 are sprung upward together and are thus removed from the photo-taking optical path as shown in FIG. 4. After the film exposure, the movable mirrors are immediately brought back to their original positions by the force of the return spring 12l.

Figure 5:
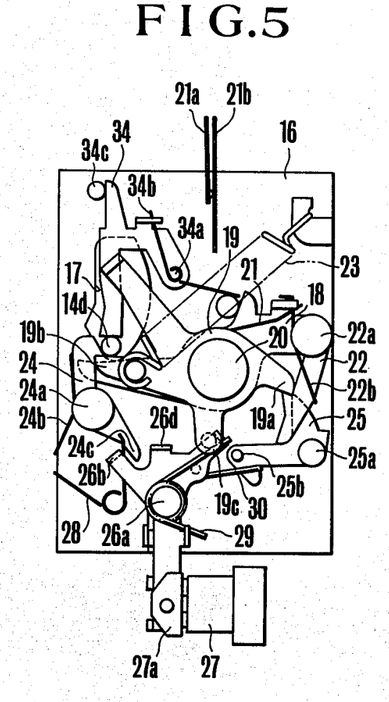
FIGS. 5, 6 and 7 are front views respectively showing a mirror drive device for driving the movable mirrors shown in FIG. 3 in sequence of stages of the operation of the device.
Figure 6:
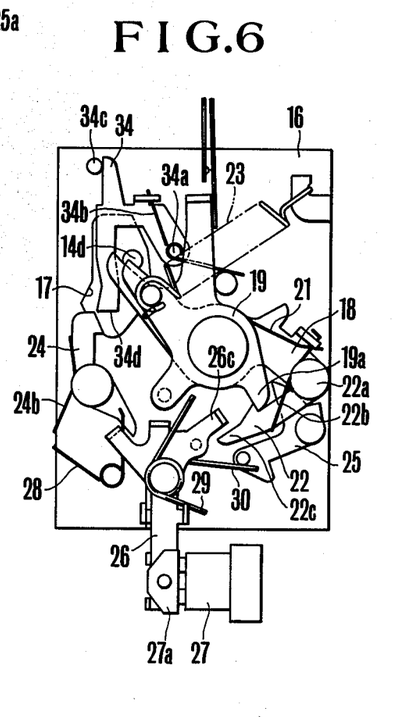
Figure 7:
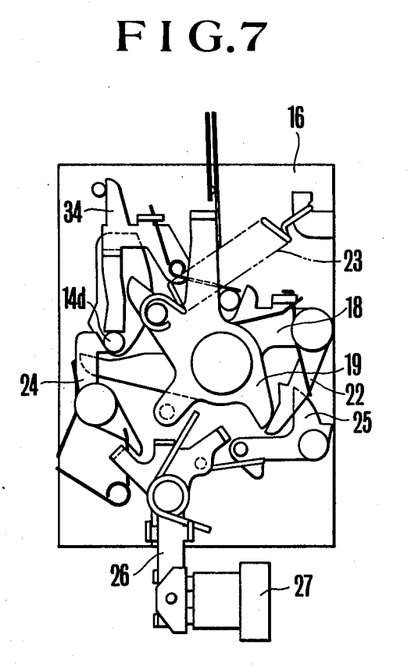

The above stated mirror driving device which drives the driving lever 14 is arranged as shown in FIGS. 5-7. Referring to these drawings, the mirror driving device is composed of a quick return mechanism which is assembled on a base plate 16. The base plate 16 is provided with a hole 17. The driving pin 14d which is attached to the driving lever 14 protrudes over the base plate 16 through the hole 17. This pin 14d engages a mirror spring up lever 18. This lever 18 and an actuating lever 19 which actuates the spring up lever 18 are rotatably carried by a shaft 20 on the base plate 16 in an overlapped state. Between the spring up lever 18 and the actuating lever 19 is disposed a spring 21 which urges them to move in opposite directions. A hook lever 22 is pivotally attached to one end of the spring up lever 18 by a shaft 22a. This hook lever 22 is urged to move clockwise by a spring 22b and is stopped by a claw part 19a of the actuating lever 19. The spring 22b thus keeps the levers 18 and 19 in their positions as shown in FIG. 5. The actuating lever 19 is further provided with a coiled spring 23 which constantly urges the lever 19 to move clockwise. Further, to keep the actuating lever 19 in the position as shown in FIG. 5 against the force of the coiled spring 23, the claw part 19b of the lever 19 is arranged to engage a hook lever 24 which is pivotally attached to the base plate 16 through a shaft 24a. The hook lever 24 is urged by the force of a spring 24b to rotate clockwise. Another lever 25 is pivotally attached to the base plate 16 and at a shaft 25a. This lever 25 normally remains in a free state and is arranged to be rotated counterclockwise by clockwise rotation of the spring up lever 18. Meanwhile, an operation lever 26 which is provided for the purpose of operating the actuating lever 19 and the spring up lever 18 is also pivotally attached to the base plate 16 through a shaft 26a. An armature 27a which is arranged to abut on a magnet 27 is disposed at one end of the operation lever 26 while a cam part which is arranged to abut on the hook lever 24 is provided at the other end of the operation lever 26.

A spring 28 is arranged to urge the lever 26 to rotate counterclockwise while other springs 29 and 30 are arranged respectively to urge the lever 26 to rotate clockwise. In the case of FIG. 5, the spring 29 is charged by a pin 19c which is secured to the actuating lever 19. Although the operation lever 26 is thus urged by the spring 29 to rotate clockwise, the magnet 27 and the armature 27a jointly keep the operation lever 26 in the position shown in the drawing against the force of the spring 29. Referring further to FIG. 5, although the spring 30 is in a free state, the spring 30 is charged by a pin 25b secured to the lever 25 when the lever 25 rotates.

Under the condition as shown in FIG. 5, when a power supply is effected to the magnet 27 to uplift the main movable mirror, the retaining force of the magnet and the armature 27a is negated and the force of the spring 29 causes the operation lever 26 to begin to rotate clockwise. With the lever 26 rotated, the cam 26b which is disposed at one end of the operation lever 26 comes to abut upon the end part 24c of the hook lever 24. This causes the hook lever 24 to rotate counterclockwise against the force of the spring 24b. The rotation of the hook lever 24 disengages the lever 24 from the claw part 19b of the actuating lever 19. The disengagement then allows the lever 19 and the spring up lever 18 to be rotated by the force of the spring 23 to their positions as shown in FIG. 6. The spring up lever 18 then drives the driving pin 14d to spring upward the driving lever 14 which is shown in FIGS. 3 and 4. Accordingly, the main and auxiliary movable mirrors 13 and 14 are uplifted to their positions as shown in FIG. 4.

With the actuating lever 19 rotated, the spring 29 is caused to abut on a stopper 26d provided on the operation lever 26 to have its spring force negated thereby. The operation lever 26 is then caused by the force of the spring 28 to rotate clockwise. With the lever 26 rotated clockwise, again the magnet 27 attracts the armature 27a. After that, the spring 30 is charged by the lever 25. However, the attracting force between the armature 27a and the magnet 27 brings the lever 26 to the position as shown in FIG. 6 against the force of the spring 30.

After a film exposure has been performed, when a power supply is again effected to the magnet 27 in response to a signal representing completion of the travel of a trailing shutter curtain, the retaining force of the armature 27a and the magnet 27 disappears. The force of the spring 30 then causes the lever 26 to rotate clockwise. Then, one end 26c of the lever 26 comes to abut upon one end 22c of the hook lever 22. This causes the hook lever 22 to rotate counterclockwise against the force of the spring 22b. The claw part 19a of the actuating lever 19 is disengaged from the hook lever 22. The disengagement causes the spring up lever 18 to be rotated counterclockwise by the force of the spring 21. This results in a condition as shown in FIG. 7. The driving pin 14d of the driving lever 14 then also descends to bring the main movable mirror, the auxiliary movable mirror and the driving lever back to their original positions as shown in FIG. 3.

In a single-lens reflex camera of the type described above, the movable mirrors tend to bounce when they come back to a point close to their original positions after completion of a film exposure as mentioned in the foregoing. In accordance with this invention, therefore, the bounce of the main movable mirror is prevented by the provision of a first anti-bounce member which is arranged to functionally engage the main movable mirror in the vicinity of the stopping position thereof; the bounce of the auxiliary movable mirror is prevented by the provision of a second anti-bounce member which is arranged to functionally engage the auxiliary movable mirror in the vicinity of the stopping position of the auxiliary movable mirror; and the bounce of the driving lever is prevented by a third anti-bounce member which is arranged to functionally engage the driving lever at a point close to the stopping position of the driving lever. The first anti-bounce members is first operated and then the second and third anti-bounce members are operated in response to the returning actions of the main movable mirror, the auxiliary movable mirror and the driving lever. In the specific embodiment shown in the drawings, the first anti-bounce member is composed of the lever 32 (see FIGS. 3 and 4). This anti-bounce lever 32 is pivotally carried by a shaft 32a and is urged to rotate clockwise by the force of a spring 32b. The anti-bounce lever 32 is attached to the bottom surface of the mirror box. A pin 12c which is secured to the fore end of the main movable mirror 12 is arranged to engage a hooked part 32c which is formed at one end of the anti-bounce lever 32. The main movable mirror 12 is arranged to be prevented from bouncing with the pin 12c engaged with the hooked part 32c.

The second anti-bounce member is composed of a lever 33 shown in FIGS. 3 and 4. The anti-bounce lever 33 is pivotally carried by a shaft 33a and is urged to rotate clockwise by the force of a spring 33b while the urged rotation is stopped by a pin 33c. The anti-bounce lever 33 is provided with a hooked part 33d which is disposed at one end of the lever 33 and is arranged to prevent the auxiliary movable mirror 13 from bouncing by engaging a pin 13d secured to the fore end of the auxiliary movable mirror 13.

The third anti-bounce member is composed of a lever 34 as shown in FIGS. 5, 6 and 7. This anti-bounce lever 34 is pivotally carried on the base plate 16 by a shaft 34a and is urged to rotate counterclockwise by the force of a spring 34b while a stopper 34c keeps the lever 34 in a position as shown in FIG. 5. The anti-bounce lever 34 has a lower extending part which is arranged to hold the driving pin 14d of the driving lever 14.

In the single-lens reflex camera which has been described in the foregoing, the main and auxiliary movable mirrors 12 and 13 are kept in the positions as shown in FIG. 3 before a film exposure to a light. Meanwhile, the mirror driving device is in the condition as shown in FIG. 5. When a film exposing operation is performed, a power supply to the magnet 27 causes the spring up lever 18 to begin to rotate. Then, the driving pin 14d of the driving lever 14 comes to abut upon the anti-bounce lever 34 and the pin 14d moves upward by pushing the lever 34 away against the force of the spring 34b. The driving lever 14 then begins to rotate upward on the shaft 14a. The pin 14c which is secured to the driving lever 14 then comes to abut on the cam 13c which is arranged in one unified body with the auxiliary movable mirror 13. This causes the auxiliary movable mirror 13 to rotate clockwise. The pin 13d which is secured to the auxiliary movable mirror 13 comes to push away the hooked part 33d of the anti-bounce lever 33 and thus to turn the hooked part 33d counterclockwise while the auxiliary movable mirror 13 is further rotated clockwise until it is pushed against the back of the main movable mirror 12. After that, the driving lever 14 causes the main movable mirror 12 and the auxiliary movable mirror 13 to rotate together. The pin 12c which is secured to the main movable mirror 12 then pushes away the hooked part 32c of the anti-bounce lever 32 moving it counterclockwise against the force of the spring 32b to allow the main movable 12 to turn upward until the main movable mirror 12 reaches its position as shown in FIG. 4.

After completion of a film exposure to a light, the mirror driving device causes the main movable mirror 12, the auxiliary movable mirror 13 and the driving lever 14 to descend together. The main movable mirror 12 comes to abut on the stopper 12b. Then, the pin 12c abuts on the slanting surface of the hooked part 32c of the anti-bounce lever 32 to cause the anti-bounce lever 32 to turn counterclockwise against the force of the spring 32b. The pin 12c engages the anti-bounce lever 32 when the main movable mirror 12 abut on the stopper 12b and thus prevent the main movable mirror 12 from bouncing. When the driving lever further rotates, the auxiliary movable mirror turns counterclockwise. The pin 13d of the auxiliary movable mirror 13 then comes to abut on the slanting surface of the hooked part 33d of the anti-bounce lever 33 to turn the anti-bounce lever 33 counterclockwise against the force of the spring 33b. When the auxiliary movable mirror comes back to its original position, the pin 13d engages the anti-bounce lever 33 to prevent the auxiliary movable mirror 13 from bouncing. Following this, the anti-bounce lever 34 provided at the mirror driving device for the driving lever 14 also prevents the driving lever 14 from bouncing when the lever 14 comes back to the condition as shown in FIG. 3. The operation of the anti-bounce lever 34 is as follows: When the driving lever 14 descends as mentioned above, the driving pin 14d of the driving lever 14 comes to abut on the side face of the anti-bounce lever 34 to turn the lever 34 clockwise against the force of the spring 34b while the lever 14 is descending. Then, the driving pin 14d comes to engage the cam part 34d of the lever 34 and there obtains the condition as shown in FIG. 7. Then, the driving lever 14 is prevented from bouncing by the action of the spring 34b. With the bounce of the driving lever 14 also prevented in this manner, the main movable mirror 12 which is carried by the driving lever 14 is completely prevented from bouncing by the provision of this arrangement in addition to the above stated action of the anti-bounce lever 32. Further, the auxiliary movable mirror 13 is likewise completely prevented from bouncing.

In accordance with the present invention, the main movable mirror, the auxiliary movable mirror and also the mirror driving lever by which the center of rotation of the main movable mirror is carried are individually prevented from bouncing when they come back to their original positions. Besides, the impact of bounce is buffered in a dispersing manner, so that the total bounce can be suppressed in a very short period of time. The invented arrangement to firmly take hold of the movable mirrors and the driving lever serves to forcedly suppress the bounce within a short period of time. Further, the invented arrangement to begin the bounce suppressing action from the main movable mirror which has the largest inertia requiring the longest period of time for bounce suppression ensures that the length of time required for overall bounce suppression can be efficiently shortened. Since the bounce of the main movable mirror also affects the auxiliary movable mirror and the driving lever, the arrangement to suppress the bounce of the main movable mirror first of all is highly effective for overall bounce suppression. These features of the invention ensures advantageous application of the invented anti-bounce device to cameras adapted for high speed continuous photographing.

While specific embodiments of the invention have been shown and described in detail to illustrate the application of the inventive principles, it will be understood that the invention may be embodied otherwise without departing from such principles.

What I claim:

1. An anti-mirror-bounce device for a single-lens reflex camera, comprising:
   a photo-taking lens forming a photo-taking optical path;
   a first mirror disposed within said photo-taking optical path;
   first locking means for locking said first mirror within said photo-taking optical path;
   a second mirror disposed within said photo-taking optical path;
   second locking means for locking said second mirror within said photo-taking optical path; and
   driving means for driving said first and second mirrors to move them away from said photo-taking path.

2. A device according to claim 1, wherein said second mirror is connected to said first mirror and is arranged to be rotatable relative to said first mirror.

3. A device according to claim 2, wherein said first mirror has a portion thereof arranged to permit passing of light therethrough and to guide the passing light to said second mirror.

4. A device according to claim 3, further including a view finder which receives light flux from said first mirror.

5. A device according to claim 4, further including light receiving means for receiving said passing light from said second mirror.

6. A device according to claim 5, further including first urging means for returning said first mirror to within said optical path.

7. A device according to claim 6, further including second urging means for returning said second mirror to within said optical path.

8. An anti-mirror-bounce device for a single-lens reflex camera, comprising:

a photo-taking lens arranged to guide light flux coming from an object to be photographed to the inside of the camera;

a view finder arranged to permit observation of an image of said object;

a first mirror arranged to reflect light flux coming through said photo-taking lens to the inside of said view finder, said first mirror having a portion thereof arranged to permit passing of light therethrough;

light receiving means provided for light or distance measurement;

a second mirror rotatably connected to said first mirror, said second mirror being arranged to reflect light flux passed through said first mirror to said light receiving means;

first locking means for locking said first mirror in a position to receive the light flux from said photo-taking lens;

second locking means for locking said second mirror in a position to receive the light flux passed through said first mirror;

first urging means for urging said first mirror to move to said position to be locked by said first locking means;

second urging means for urging said second mirror to move to said position to be locked by said second locking means; and driving means for driving said first and second mirrors to move them to positions where they are not receiving the light flux from said photo-taking lens, said driving means being arranged to first drive the second mirror before driving the first mirror.

9. A device according to claim 8, wherein said first and second locking means are provided with stopping means which are arranged to have said first and second mirror come to abut thereon.

10. A device according to claim 9, wherein said first and second mirrors respectively have protrudent parts which are arranged to directly engage said first and second locking means.

11. A device according to claim 10, wherein said first mirror engages said first locking means after completion of a photographing operation and, following that, said second mirror engages said second locking means.

12. An anti-mirror-bounce device for a single-lens reflex camera, comprising:

a photo-taking optical system forming a photo-taking optical path;

first mirror means disposed within said photo-taking optical path, said first mirror means having a portion thereof arranged to permit passing of light therethrough;

second mirror means for receiving light flux which has passed through said light passing permitting portion of said first mirror means, said second mirror means being rotatably connected to said first mirror means;

driving means for moving said first and second mirror means away from said photo-taking optical path, said driving means being capable of rotating on a rotation shaft and being connected to said first mirror means at a point located away from said rotation shaft;

first and second fixing means for fixing said first and second mirror means in predetermined positions within said photo-taking optical path, said first and second fixing means respectively having first and second preventing parts which are arranged to prevent said first and second mirror means from bouncing;

third fixing means for fixing said driving means in a predetermined position within said photo-taking optical path, said third fixing means having a third preventing part which prevents said driving means from bouncing; and returning means for returning said first and second mirror means and said driving means to within said photo-taking optical path and for causing them to respectively engage said first, second and third fixing means.

13. A device according to claim 12, wherein said second mirror means and said driving means are arranged to engage said second and third fixing means respectively after said first mirror means has engaged said first fixing means.

* * * * *